United States Patent [19]

Nesterick et al.

[11] Patent Number: 5,020,624

[45] Date of Patent: Jun. 4, 1991

[54] POWER DRIVE SCOOTER

[75] Inventors: Elaine M. Nesterick, Ventura; Robert W. Reynolds, Camarillo; Spencer L. MacKay, Agoura Hills; Cleve A. Graham, Simi Valley, all of Calif.

[73] Assignee: Everest & Jennings, Inc., Camarillo, Calif.

[21] Appl. No.: 434,361

[22] Filed: Nov. 13, 1989

[51] Int. Cl.⁵ .................. B62K 11/02; B62K 5/06; B62K 15/00

[52] U.S. Cl. .................. 180/210; 180/211; 180/216; 180/208; 280/278; 280/242

[58] Field of Search ........... 280/208, 278, 273, 12.14, 280/282; 180/210, 211, 212, 213, 55, 19.1, 19.2, 19.3, 215, 216

[56] References Cited

U.S. PATENT DOCUMENTS

| Re. 30,867 | 2/1982 | Gaffney | 280/642 |
|---|---|---|---|
| D. 171,318 | 1/1952 | Wegele | D40/1 |
| 1,268,229 | 6/1918 | Frank . | |
| 1,281,980 | 10/1918 | Kostewich . | |
| 1,293,958 | 2/1919 | Smedshammer . | |
| 1,296,531 | 3/1919 | Landby . | |
| 1,309,305 | 7/1919 | Scheiner . | |
| 1,428,907 | 9/1922 | Reigh . | |
| 1,459,371 | 6/1923 | Kelly . | |
| 2,574,199 | 11/1951 | Tandler et al. . | |
| 2,594,034 | 4/1952 | King . | |
| 2,696,272 | 12/1954 | Schlaphoff . | |
| 2,749,997 | 6/1956 | Deslippe . | |
| 2,817,406 | 12/1957 | Brewer . | |
| 2,973,048 | 2/1961 | Jensen . | |
| 2,978,251 | 4/1961 | Gerdes | 280/12.14 |
| 3,043,389 | 7/1962 | Steinberg | 180/27 |
| 3,079,172 | 2/1963 | Burwell | 280/278 |
| 3,110,352 | 11/1963 | McClarnon | 180/211 |
| 3,117,648 | 1/1964 | Landreth | 180/55 |
| 3,190,676 | 6/1965 | Junge | 280/273 |
| 3,249,171 | 5/1966 | Kinghorn | 180/27 |
| 3,254,734 | 6/1966 | Behrmann | 180/19 |
| 3,369,629 | 2/1918 | Weiss | 180/27 |
| 3,580,349 | 5/1971 | Brennan et al. | 180/27 |
| 3,713,502 | 1/1973 | Delaney et al. | 180/27 |

(List continued on next page.)

FOREIGN PATENT DOCUMENTS 1064076 3/1954 France .
2127364A 4/1984 United Kingdom .

OTHER PUBLICATIONS

Regent by A-BEC, Author: A-BEC Sunrise Medical, 3 pages.
Discover the Difference Sierra TM Can Make in Your Life, Author: Ortho-Kinetics, Inc., Date: 1988, 3 pages.
Encore (Model 438) Ortho-Kinetics, Inc., Author: Ortho-Kinetics, Inc., Date: 1988, 2 pages.
It'll Break in a Minute, Author: Everest & Jennings, Inc. Date: Feb. 9, 1989.

Primary Examiner—Richard A. Bertsch
Attorney, Agent, or Firm—Kelly, Bauersfeld & Lowry

[57] ABSTRACT

A modular power drive scooter, including as modular components a seat, a seat post, a mainframe, a trailer and at least one battery, is built in a manner allowing quick and easy disassembly of the scooter for compact storage. In assembled form, the seat post supports the seat and also serves as a lock pin which prevents separation of the mainframe from the trailer. The mainframe includes a front wheel, a tiller assembly for steering the scooter, and recesses for accommodating one or more batteries. The trailer includes a pair of rear wheels coupled to a differential which is driven by an electric motor, and a removable storage tray that provides access to the motor. A stem member extending from the trailer engages the mainframe in an overlapping relation whereby apertures in the stem member align with ports in the mainframe. The seat post is inserted into a selected port to determine the spacing of the seat from the tiller assembly. Removal of the seat post from an aligned aperture and port enables the mainframe and the trailer to be separated by pulling a first handle located on the stem member to pivot the trailer relative to the mainframe, and then by lifting the mainframe by a second handle to disengage coupling hooks on the mainframe from a coupling rod of the trailer.

32 Claims, 4 Drawing Sheets

U.S. PATENT DOCUMENTS

| | | | |
|---|---|---|---|
| 4,037,678 | 7/1977 | Braune | 180/11 |
| 4,042,054 | 8/1977 | Ward | 180/60 |
| 4,353,567 | 11/1982 | Weldy | 180/211 |
| 4,452,327 | 6/1984 | Mowat et al. | 180/11 |
| 4,460,057 | 7/1984 | Kohyama | 180/210 |
| 4,469,188 | 9/1984 | Mita | 180/215 |
| 4,541,501 | 9/1985 | Kawasaki | 280/282 |
| 4,570,739 | 2/1986 | Kramer | 180/216 |

OTHER PUBLICATIONS

Ortho-Kinetics, Inc. The Independence Company, Author: Ortho-Kinetics, Inc., Date: Aug. 1986.

Sterling by A-BEC, Author: A-BEC Sunrise Medical, 4 pages.

Pacer TM, Author: Everest & Jennings, Inc., Date: 1986, 4 pages.

Mobie Owner's Manual, Author: Everest & Jennings Inc., Date: 1985, 22 pages.

Pacer 3-Wheeled Scooter Owner's Manual, Author: Everest & Jennings, Date: Apr. 1987, 15 pages.

The 20000FS From Fortress Scientific . . . , Author: Fortress Scientific, 6 pages.

Ortho-Kinetics, Inc. a Three-Wheeler for Every Need, Author: Ortho-Kinetics, Inc., Date: 1988, 2 pages.

Moving Special People, Author: Alpha Unlimited, 2 pages.

Fun and Independence From Electric Mobility, Author: Electric Mobility Corporation, Date: 1986, 15 pages.

Mobie, Author: Everest & Jennings, Date: 1988, 4 pages.

Mobility at Your Fingertips, Author: PaceSaver+Plus II, 4 pages.

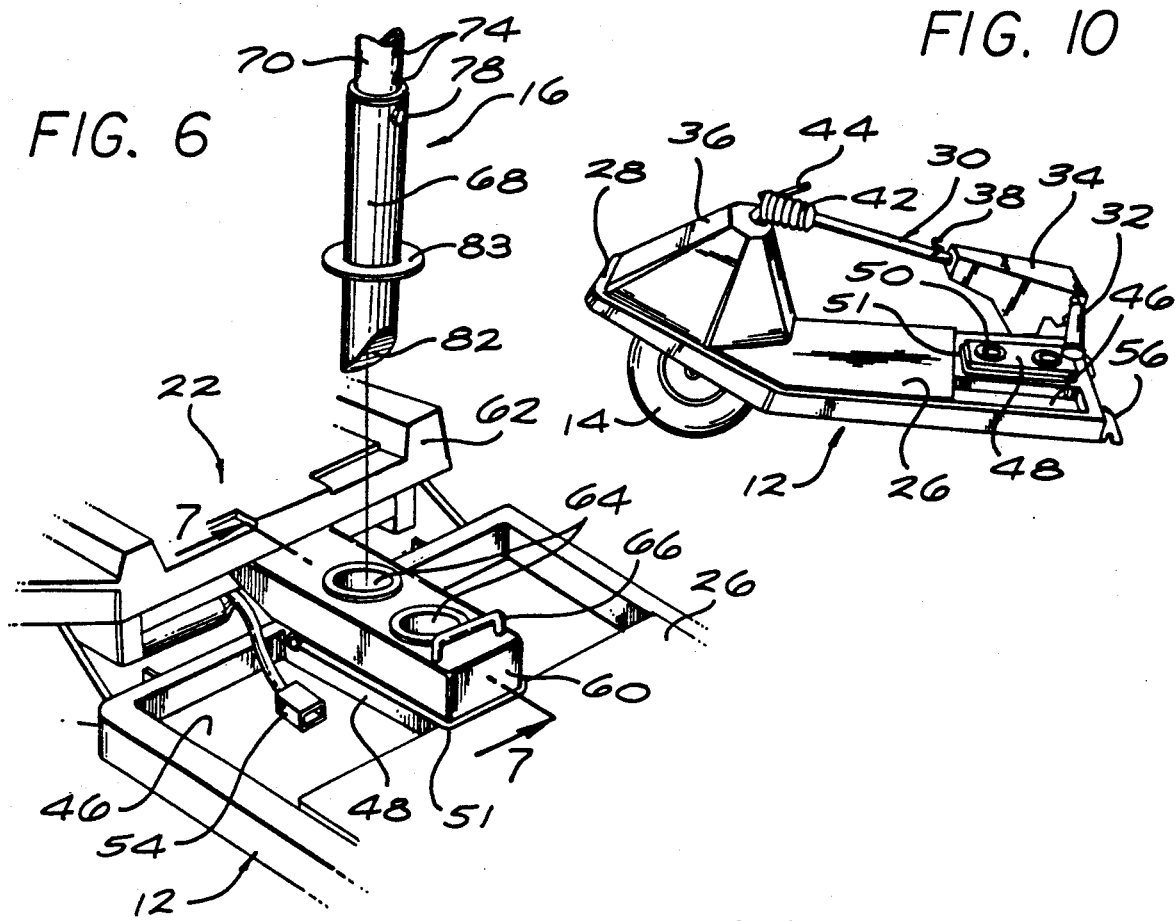
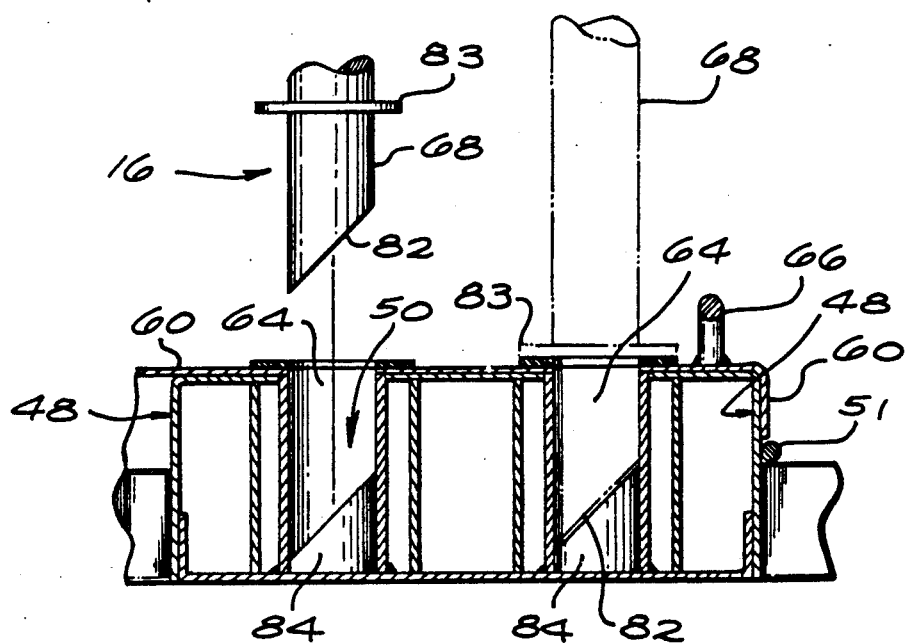
FIG. 6
FIG. 10
FIG. 7

POWER DRIVE SCOOTER

BACKGROUND OF THE INVENTION

This invention relates generally to power drive scooters of the type having an on-board battery powered motor for driving one or more wheels. More particularly, this invention relates to an improved power drive scooter which is constructed to permit quick disassembly of the scooter into a small number of compact modules.

Power drive scooters commonly comprise a frame supported on wheels that are driven by a battery powered motor. Typically, a seat is attached to the frame in close proximity to handlebars or the like, for steering the scooter. Electronic control circuitry is included to regulate operation of the motor. The control circuitry enables a rider to select the speed and drive direction of the scooter.

Although power drive scooters of the general type described above provide an excellent means of transportation, especially for some physically disabled people, prior scooters usually were not designed for disassembly into compact components for easy storage and transport. Prior scooters are often too heavy or too large to be loaded into standard passenger automobiles. As a result, vehicle transportation of many previous power drive scooters has been limited to the use of vans or trucks. Sometimes in order to transport prior scooters, the use of specialized vehicles having power lift mechanisms for loading and unloading the scooter from the vehicle, has been required.

Such transportation and storage problems have led to the development of power drive scooters which may be disassembled into component subassemblies, such as the scooter disclosed in U.S. Pat. No. 4,570,739, which is incorporated herein by reference. However, a number of drawbacks are associated with the disassembly of these prior modular scooters. For example, tools are often required for assembly/disassembly, and the disassembly procedure itself can be time consuming or prohibitively difficult for a physically handicapped person. Sometimes disassembly of the scooter results in an excessive number of separate component parts, some of which may be easily lost or misplaced. Moreover, in some cases storage and/or transportation of the scooter is hindered because the disassembled parts are difficult to handle or are too heavy to easily lift.

There exists, therefore, a significant need for an improved power drive scooter that is designed for easy assembly and rapid disassembly into a small number of modular components which fit within most standard passenger automobiles. Such an improved scooter should include a minimum number of component parts which interlock or separate in a quick and easy manner without requiring the use of tools. Moreover, such a scooter should utilize relatively light and compact component parts, be attractive in appearance, and be constructed for durable and safe operation. The present invention fulfills these needs and provides further related advantages.

SUMMARY OF THE INVENTION

An improved power drive scooter is constructed from a small number of compact modular components or subassemblies which are adapted for rapid assembly and/or disassembly without requiring the use of tools. In the assembled configuration, the modular components cooperatively define a battery powered rear wheel drive scooter suitable for both indoor and outdoor use.

In accordance with the invention, the improved power drive scooter comprises, generally, a mainframe module including a front end supported by a front wheel, and a tiller assembly for steering the front wheel. The rear end of the mainframe module releasably interlocks with a trailer module including a drive train for powering a pair of rear wheels. A detachable seat post dually functions as a lock pin for ensuring that the mainframe and trailer modules remain joined, and as support for a seat module. Power for the drive train is provided by one or more storage batteries carried on the mainframe module. The entire scooter consists of only the mainframe module, the trailer module, the seat module and at least one battery unit.

As illustrated in connection with a preferred form of the invention, the mainframe module includes recesses for holding the batteries, and a tiller assembly that conveniently collapses into a compact storage position. The trailer module includes an apertured tongue bracket or stem member which, in the assembled configuration, rests atop a ported reinforced base of the mainframe module. The apertures of the stem member align with cup-like ports provided in the reinforced base, and they together provide means for receiving the seat post to interlock the trailer and mainframe modules together. At least two ports are provided and spaced from the tiller assembly at different distances so that the position of the seat can be selected in accordance with the size of the rider.

The seat post is adjustable to various lengths to enable the rider to select the height of the seat module. A lower end of the seat post is chamfered to serve as a key which interlocks with a wedge disposed within a selected port to prevent rotation of the seat post within the port. A lower seat post flange is spaced from the lower end for supporting the seat post on the stem member.

The mating arrangement between the seat and the seat post enables the seat to swivel 360°. However, for stability during scooter operation, the seat is normally locked against swiveling by a lever which is located underneath the seat for releasable engagement within slots of a slotted gear located at the upper end of the seat post. Preferably, the anti-swivel lever is spring biased to normally maintain a locked position so that the seat module will only swivel when the lever is manually released.

To begin disassembly of the improved power drive scooter, the batteries are unplugged from the motor and lifted from the recesses in the mainframe module. Next, the seat post is removed from its designated port to unlock the trailer and the mainframe modules.

Complete disengagement of the trailer and mainframe modules is quickly accomplished by pulling upwardly on a handle connected to the stem member of the trailer module to pivot the trailer module to an upright position. This has the effect of orienting a coupling arrangement (provided by the engagement of coupling hooks on the mainframe module with a trailer module coupling rod) in a separable configuration. The mainframe module is then lifted to disengage the coupling hooks from the coupling rod.

Once the mainframe module has been uncoupled from the trailer module, the tiller assembly is collapsed for use as a handle during transport. Individually, the scooter module components and the battery units are compact and relatively lightweight so that all such components can be placed in a car trunk or similar storage space. The mainframe module, trailer module, batteries and the seat module can be subsequently reassembled without tools by manually fitting the components together in a few easy steps.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 6 is an enlarged perspective view of overlapping portions of the trailer and mainframe modules shown in FIG. 2, illustrating alignment of the seat post with an aperture in a stem member of the trailer module;

FIG. 7 is an enlarged, cross-sectional view taken generally on line 7—7 of FIG. 6, illustrating a chamfered lower end of the seat post which, when positioned to abut a mating wedge disposed inside the mainframe module, prevents rotation of the seat post;

FIG. 10 is a perspective view of the mainframe module of FIG. 2, illustrating a tiller assembly in a collapsed storage position.

DETAILED DESCRIPTION OF THE PREFERRED EMBODIMENT

Figure 2:
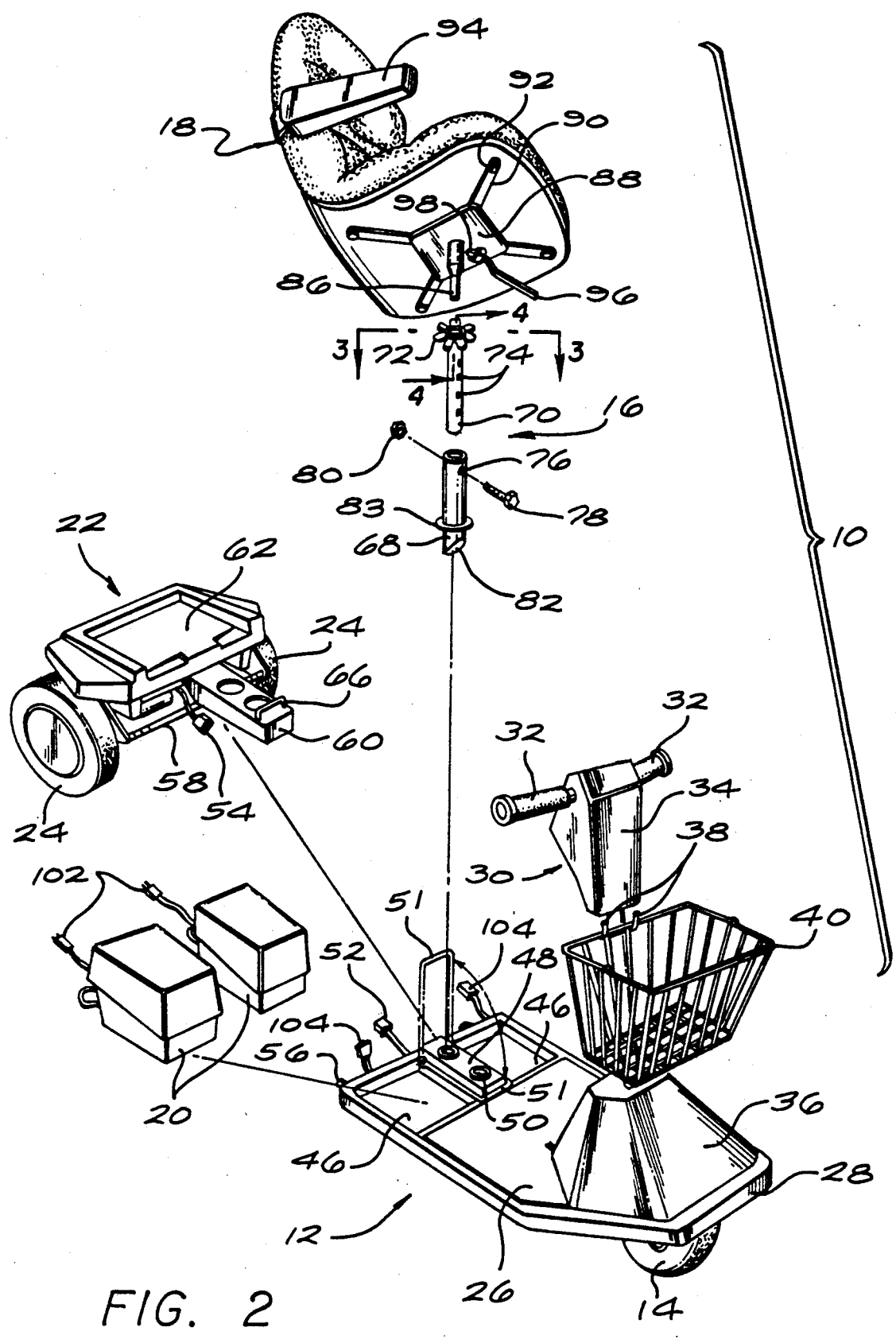
FIG. 2 is an exploded perspective view of the power drive scooter shown in FIG. 1, illustrating separable modular components comprising the scooter.

As shown in the exemplary drawings, an improved power drive scooter, referred to generally by the reference numeral 10, is constructed from a small number of compact modular components adapted for rapid, easy assembly and disassembly. These modular components, shown in exploded relation in FIG. 2, are individually sized and shaped to facilitate handling during transportation and/or storage of the scooter 10 in the disassembled state. These modular components are designed to enable one to completely disassemble the scooter by merely lifting each component out of engagement with its adjacent component. Subsequent re-assembly of the scooter can also be achieved without using tools as the components are adapted to be manually combined in a fast, efficient manner.

In general terms, as viewed in FIG. 2, the modular power drive scooter 10 comprises a mainframe module 12 defined by a relatively compact rigid platform 26 having a front end supported by a front wheel 14. The mainframe module 12 is connected to a trailer module 22, which is adapted to support a removable seat post 16 and seat 18. A pair of closed battery containers 20 are removably mounted on the mainframe module and each include an electrical storage battery for providing power to the scooter. Rear wheel drive is provided by the trailer module 22 which includes a drive train (not visible) and a pair of rear wheels 24 which support the rear end of the scooter when the trailer module 22 is connected to the mainframe module 12.

Figures 1, 3, 4, 5:
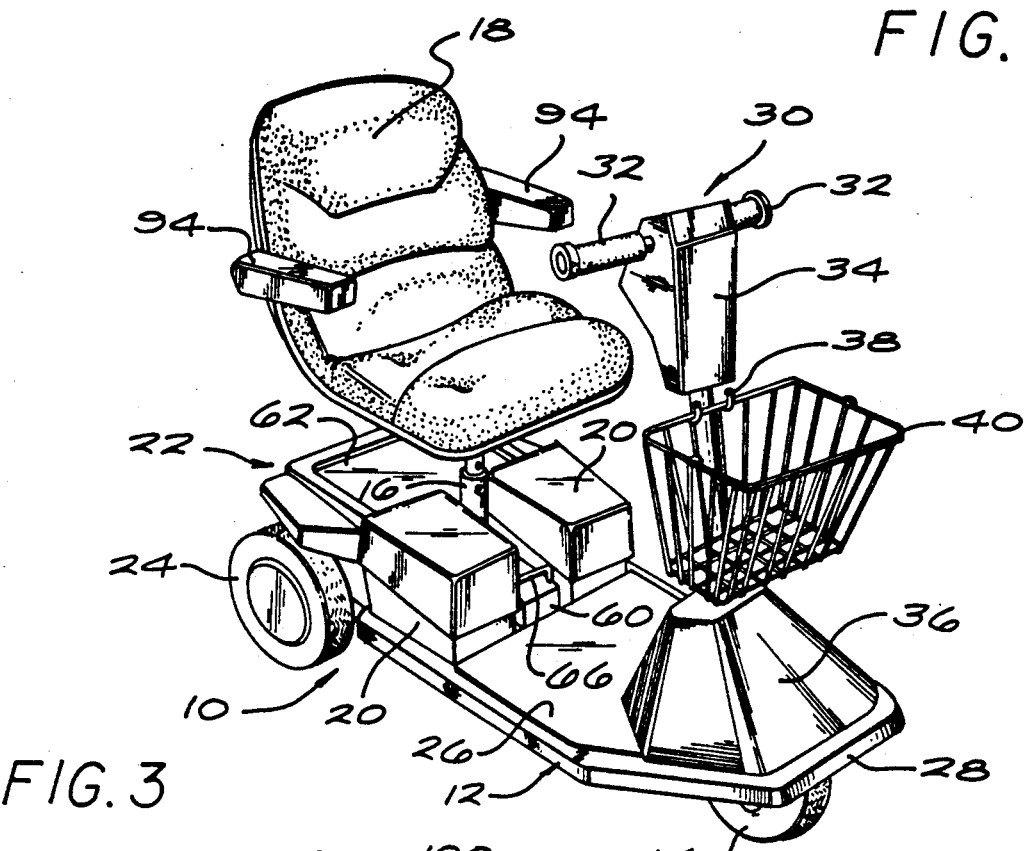
FIG. 1 is a perspective view of a power drive scooter em the invention.
FIG. 3 is an enlarged plan view taken generally on line 3—3 of FIG. 2, illustrating an anti-swivel locking mechanism which includes an anti-swivel lever (shown in fragment) and a slotted gear located atop a seat post.
FIG. 4 is an enlarged cross-sectional view taken generally on line 4—4 of FIG. 2, illustrating the upper end of the seat post and engagement of the anti-swivel lever with the slotted gear (the lever also being shown in phantom in a disengaged position which permits the seat module to freely swivel)
FIG. 5 is a top plan view of the seat module of FIG. 2, illustrating, in phantom, the seat module in a swiveled position.

More specifically, as viewed in FIGS. 1, 2 and 10, the mainframe module 12 comprises a rigid platform 26 having a rubber, wrap-around bumper 28 and an adjustable tiller assembly 30. The platform 26 is preferably only twenty-four inches wide to enable the power drive scooter 10 to freely fit through grocery store checkout aisles, doorways, etc.

The tiller assembly 30 permits the front wheel 14 to be steered by foam padded handlebars 32 disposed at the upper end of the tiller assembly. A head 34 of the tiller assembly 30 is located between the handlebars 32 and provides a control panel in facing relation with a seat module occupant.

The control panel includes a battery level indicator and a speed selection dial preferably having six different speed settings. A button on each side of the control panel enables a built-in electric horn to be activated by either hand of a rider. The control panel further includes an on/off switch which cannot be activated without first inserting a safety key within a keyhole in the control panel. One can trigger an electric power flow to the drive train with either hand by applying pressure to a thumb control lever on the control panel. This lever is divided into reverse movement and forward movement portions so that the rider can select the scooter direction. The location of the thumb control lever enables it to be manipulated by the thumb of a single hand while the same hand can simultaneously grasp a handlebar 32 for steering. The acceleration of the scooter is responsive to the manner in which pressure is applied to the thumb control lever, with a gradual increase in thumb pressure resulting in a gradual increase in scooter speed and a sharp increase in thumb pressure causing more rapid scooter acceleration. This feature is provided by pressure sensitive means in cooperation with a controller box discussed hereinafter.

The tiller assembly 30 extends through a fender 36 and terminates in a conventional yoke arrangement which retains the front wheel 14 in a manner permitting free rotation. Preferably, the yoke arrangement limits the radius of steering to ensure that the scooter will not turnover by attempting to negotiate too sharp of a turn. A recommended maximum turning radius is 55° or forty inches.

The middle portion of the tiller assembly 30 includes a pair of hooks 38 which support a removable storage basket 40. The lower portion of the tiller assembly 30 includes a hinge by which the tiller assembly can be pivoted in the fore or aft directions. An elastic boot 42 covers this hinge with a spring loaded lever 44 protruding from the elastic boot. The hinge enables the tiller assembly to be pivoted forward to an out-of-the-way position to facilitate boarding, or to a collapsed orientation (FIG. 10) to provide the mainframe module with a more compact storage profile. Moreover, for optimum steering comfort, the tiller assembly can be adjusted to a variety of other orientations relative to the platform 26 by manipulating the lever 44 which locks the tiller assembly in a selected position. As an option, a rear view mirror can be provided atop the tiller assembly.

Figure 8:
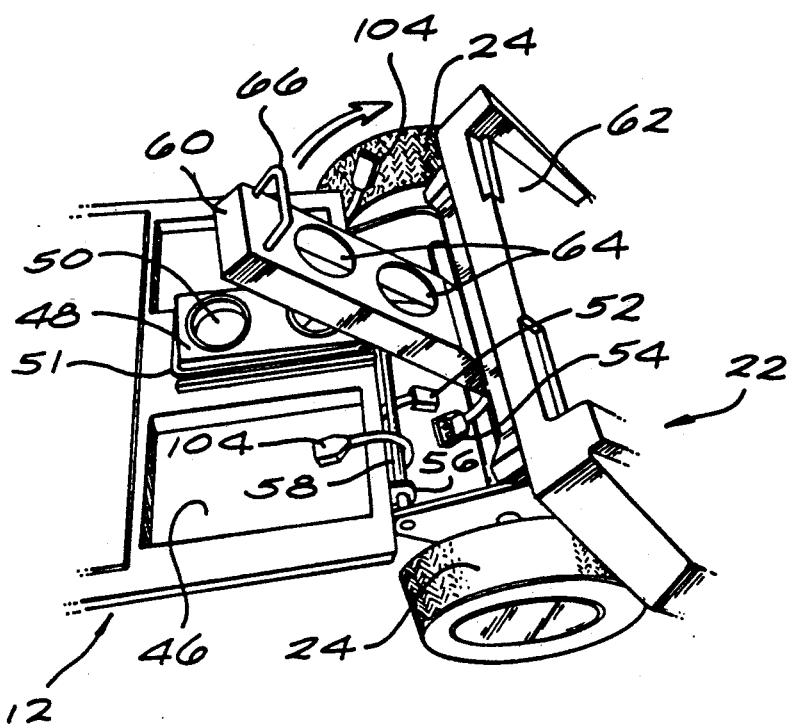
FIG. 8 is a fragmented perspective view similar to FIG. 6, showing the first step of separating the trailer and the mainframe modules, in which the trailer is pivoted into an upright position.
Figure 9:
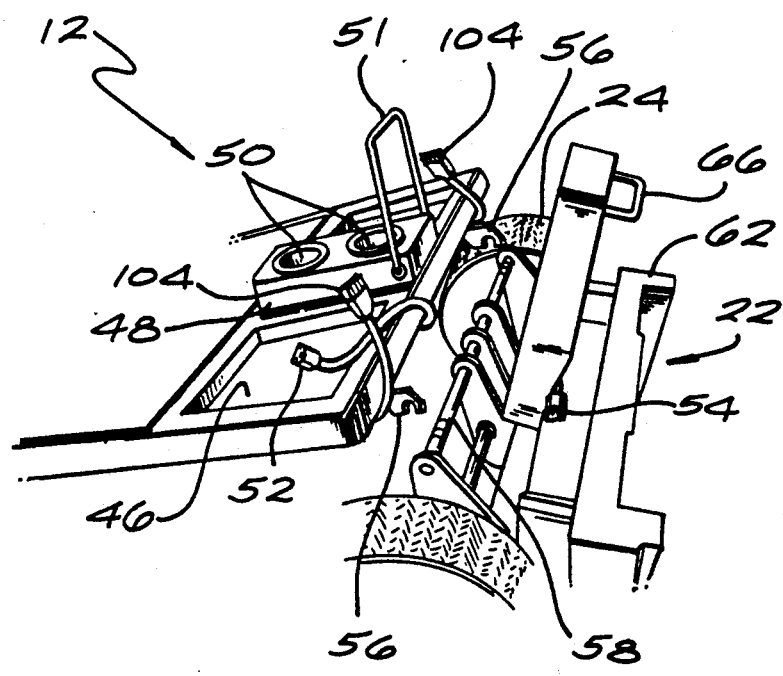
FIG. 9 is another fragmented perspective view similar to FIGS. 6 and 8, showing the second step of separating the trailer and the mainframe, in which the mainframe is lifted out of engagement with the upright trailer.

In accordance with the present invention, the platform 26 of the mainframe module 12 has two rectangular recesses 46 for holding the battery containers 20. These recesses 46 are located on either side of a reinforced base 48. The reinforced base 48 includes two ports 50 which each have a cup-like interior for receiving a lower end of the seat post. The ports 50 are located at different distances from the front of the scooter so that the spacing of the seat module from the handlebars can be chosen in accordance with the height of the scooter occupant by selecting an appropriate port 50 for placement of the seat post. Preferably, the ports 50 are spaced approximately four inches apart on center. The reinforced base 48 also has a handle 51 pivotably attached thereto such that the handle 51 can be swung from a non-use position (FIGS. 6, 8 and 10) to an upwardly extending position (FIGS. 2 and 9).

The platform 26 houses a controller box (not shown) having appropriate electronic and/or solid state components encased therein. The controller box is electrically connected to an electric motor in the trailer module by a mainframe plug 52 which releasably connects with a trailer plug 54. The controller box is also wired to the control panel of the tiller assembly so that, in response to manipulation of the controls, the controller box can regulate the supply of power to the motor in a manner controlling scooter speed and direction. Moreover, the controller box automatically controls the current level to the motor to prevent overheating. Specifically, if the motor temperature reaches 69° C., the controller box reduces current to the motor from a 45 amp maximum to 20 amps for two minutes of reduced speed. If the motor is still overheating after this reduced speed period, the controller box will shutdown the motor to promote cooling.

A skid plate underneath the mainframe module protects the underside of the controller box from bumps. Moisture protection for the controller box is provided by weatherproofing strips disposed between the skid plate and the platform 26.

The mainframe module 12 attaches to the trailer module 22 by a coupling arrangement wherein coupling hooks 56 (FIGS. 9 and 10), which extend rearwardly from the platform 26, engage a trailer module coupling rod 58 (FIG. 2). The mainframe and trailer modules are interlocked against separation by securing a trailer module stem member 60 to the mainframe reinforced base 48.

The trailer module 22 houses a drive train which powers the rear wheels 24 with a differential unit that is chain driven by a 24 volt DC motor. This provides rear wheel drive for the scooter which enables the scooter to attain a maximum speed of approximately 5½ mph and also permits travel on inclines of up to 20°. The differential unit provides different rotation rates of the rear wheels 24 to allow tighter turns of the scooter 10 than would be possible with a solid axle interconnecting the rear wheels. In a manner well known in the art, the electric motor provides electro-mechanical braking which activates in the absence of a demand for driving power so that the scooter is automatically brought to a smooth stop by simply releasing the thumb control lever. Braking also occurs to prevent backward coasting while driving the scooter up an incline. This electro-mechanical braking can be characterized as dynamic/regenerative braking, in that a portion of the braking current will flow back to storage batteries within the battery containers 20 to recharge said batteries.

Access to the drive train of the trailer module 22 is provided by a snap-off cover 62. The cover 62 is configured as a recessed tray to provide additional storage space on the scooter. With the cover 62 removed to expose the motor, a freewheeling lever will become accessible to provide a manual release for disengaging the rear wheels from any braking action. Movement of the freewheeling lever to the disengaged position allows freewheeling action of the rear wheels 24 so that one can push the scooter if the batteries are fully discharged.

The underside of the trailer module includes a skid plate around the motor and differential for protecting these components from bumps. Since the power drive scooter is designed for indoor as well as outdoor use, this skid plate also performs the valuable function of capturing any oil leakage which might otherwise soil a carpeted area.

The stem member 60 of the trailer module 22 extends forwardly for use in interlocking the trailer and mainframe modules together. The stem member 60 has a rectangular shape and is dimensioned to fit over the reinforced base 48 so that the stem member can rest thereupon in the configuration illustrated in FIG. 6. When the stem member 60 is positioned in this overlapping relation with the reinforced base 48, a pair of apertures 64 in the stem member will be aligned respectively with the ports 50 in the reinforced base. Subsequent insertion of a lower end of the seat post 16 through a selected aperture 64 and into the corresponding aligned port 50 will interlock the trailer and mainframe modules against separation, with the seat post functioning as a lock pin. The stem member 60 also has an upwardly extending handle 66.

The use of the seat post as a lock pin in the present invention beneficially obviates the need to use any accessory components for this interlocking function. The seat post 16 serves this purpose ideally because it enables the trailer and mainframe modules to be rapidly interlocked or unlocked without tools. As best seen in the exploded view of FIG. 2, the seat post 16 comprises a metal outer sleeve 68 which accommodates a metal shaft 70 having a coaxial slotted gear 72 disposed at its upper end. An inner plastic sleeve (not visible) is located between the outer sleeve 68 and the shaft 70 to facilitate sliding the shaft within the outer sleeve so that the length of the seat post can be adjusted. For this purpose, the shaft 70 includes a plurality of bores 74, any one of which can be aligned with an aperture 76 in the outer sleeve 68 so that a bolt 78 can be passed through the aperture 76 and an aligned bore 74 to fix the seat post at a height selected in accordance with the size of the scooter occupant. A nut 80 secures the bolt 78 in place. Preferably, the lengths of the outer sleeve 68 and the shaft 70, as well as the placement of the bores 74, are suitable for allowing the seat post to be adjusted to four different heights relative to the platform 26, within a range having a maximum height of eighteen inches and a minimum height of fourteen inches.

The lower end 82 of the outer sleeve 68 is chamfered to serve as a key which mates with a complementary wedge 84 (FIG. 7) disposed within a selected port 50. The chamfered end 82 cooperates with the wedge 84 to prevent rotation of the seat post 16 within the port 50. The end 82 can be inserted into either port 50. A flange 83 spaced from the lower end 82 encircles the outer sleeve and is positioned to provide the primary supporting surface for the seat post 16. As shown in FIG. 7, the flange 83 rests atop the stem member 60. Alternatively, the flange 83 may be deleted and the lower end 82 can support the seat post 16 over the wedge 84.

The shaft 70 of the seat post 16 has a conical inner configuration 85 at its upper end (FIG. 4) which is shaped for reception of a cone-shaped stem 86 (FIG. 2) projecting downwardly from a base plate 88 that is secured to the underside of the seat 18 by braces 90 and bolts 92. Attachment of the seat 18 to the seat post 16 involves simple insertion of the conical stem 86 within the upper end of the shaft 70. The cone shaped mating arrangement between the seat 18 and the seat post 16 advantageously enables the seat to be slidably received within the seat post in an easy, drop-in manner which eliminates the need for accessory coupling components or tools. Moreover, this mating arrangement of cooperating conical surfaces enables the seat 18 to swivel upon the seat post 16 and be quickly removed therefrom in an efficient lift-out manner.

The seat 18 includes a pair of padded, vinyl covered armrests 94 which are disposed at either side of the seat and are steel reinforced for weight bearing strength. Beneficially, both armrests 94 swing up to an out-of-the-way position to facilitate boarding. The seat is also vinyl backed for moisture resistance.

In regard to the swiveling action of the seat 18, an anti-swivel lever 96 is bolted to the base plate 88. The lever 96 is of sufficient length to extend outwardly from beneath the seat 18 for accessibility by the occupant of the seat. A tip 98 of the anti-swivel lever 96 is captured within a selected one of slots 100 found around the perimeter of the slotted gear 72 (as illustrated in FIG. 3). In this manner, the anti-swivel lever 96 engages the shaft 70 of the seat post 16 to prevent the seat from swiveling. The lever 96 can be manually manipulated to position the lever tip 98 out of engagement with the slotted gear 72 (as shown in dashed outline in FIG. 4) to permit the seat to freely swivel throughout 360°. The anti-swivel lever 96 is spring biased to automatically return to a locked position within a slot 100 so that the seat 10 will normally be locked against swiveling for a more stable ride during operation of the scooter.

The primary utility of this swivel feature is to facilitate boarding of the scooter. Since the slotted gear 72 is preferably provided with eight slots 100 around its perimeter, the seat 18 can be locked in eight different orientations. Thus, the seat can be locked in an orientation facing one side of the scooter (FIG. 5) for easier boarding. The locking of the seat from swiveling during boarding is an advantageous feature in that the efforts of a physically impaired rider to board the scooter could be hindered by an unstabilized, freely swiveling seat.

Located beneath the seat 18 within the recesses 46 are the battery containers 20. Preferably, a 24 volt system is provided by protectively encasing one 12 volt lead acid or gel cell storage battery in each battery container 20.

The battery containers 20 are lightweight cases of molded plastic, or the like, with recessed handholds or handles. Each battery container 20 has an exterior plug 102 which is releasably joined to a respective one of two plugs 104 provided by the mainframe module 12 for connecting the controller box to a power supply. A 30 amp circuit breaker is also included on one of the battery containers.

One of the battery containers 20 has an exterior socket adapted to receive a charger lockout key. The presence of the charger lockout key within this socket completes the electrical circuit of the scooter so that the scooter cannot be operated without the charger lockout key in place. In order to charge the batteries, the charger lockout key must be removed, thus ensuring that the scooter cannot be driven during charging. Advantageously, the batteries need not be removed from the scooter for charging.

The present invention can be modified to include a canopy over the seat module or a potentiometer for slowing the scooter down while turning. The entire scooter weighs only 110 lbs. (without batteries) with its heaviest component, the trailer module, weighing only 44 lbs. Thus, the weights of the individual components do not hinder execution of the disassembly steps which will now be described.

The initial step of disassembling the power drive scooter can either be to unplug the battery containers 20 and lift the containers out of the recesses 46, or to lift the seat 18 out of engagement with the seat post 16. The latter is the preferred initial step because removal of the seat module will provide greater access for removing the battery containers 20.

Following removal of the seat 18 and the battery containers 20, the seat post 16 is lifted out of its port 50 in the reinforced base 48 to unlock the trailer module 22 from the mainframe module 12 (FIG. 6). Next, the trailer module 22 is pivoted on its rear wheels 24 to an upright position (shown in FIG. 9) in which the trailer module 22 rests upon its rear bumper. This is accomplished by pulling upwardly upon the handle 66 (FIG. 8) to position the trailer module 22 relatively normal to the mainframe module 12. At this point, the plugs 52 and 54 should be disconnected.

The pivoting of the trailer module 22 to an upright position orients the coupling arrangement formed by the coupling hooks 56 and the coupling rod 58 in a separable configuration. Disengagement of the mainframe module 12 from the trailer module 22 is completed by pivoting the mainframe handle 51 from the non-use position shown in FIG. 8 to the upright position shown in FIG. 9, and lifting the mainframe module 12 by the handle 51 to raise the coupling hooks 56 out of engagement with the coupling rod 58 (FIG. 9). Thus, complete disassembly of the power drive scooter can be effected without tools by merely lifting each component out of engagement with its adjacent component.

Once the mainframe module 12 has been separated from the trailer module 22, the tiller assembly 30 can be folded down into a relatively horizontal collapsed storage position (FIG. 10) by manipulating the lever 44. The lever 44 can then be used to lock the tiller assembly 30 in this orientation so that the tiller assembly 30 can be used as another handle for lifting the mainframe module into a storage area such as an automobile trunk. In order to ensure that the tiller assembly 30 will remain in the horizontal orientation shown in FIG. 10, a strap (not shown) can be used to further secure the tiller assembly to the mainframe module. As shown in FIG. 10, the basket 40 can also be removed if a more compact storage profile is desired.

Re-assembly of the power drive scooter is similarly quick and easy. The trailer module 22 is oriented in an upright position to expose the coupling rod 58. Next, the mainframe module 12 is lowered onto the trailer module 22 such that the coupling hooks 56 rest upon the coupling rod 58. In this position, the plugs 52 and 54 can be easily joined. Then the trailer module is pivoted downwardly towards the mainframe module to trap the coupling rod 58 within the coupling hooks 56 and place the stem member 60 in overlying relation with the reinforced base 48. At this point, the apertures 64 in the stem member 60 will be aligned with the ports 50 in the reinforced base 48 (as depicted in FIG. 7) and the mainframe and trailer modules can be interlocked by inserting the seat post/lock pin 16 into a selected port 50. Assembly is completed by placing the battery containers 20 within the recesses 46 of the platform 26, connecting the battery plugs 102 with the mainframe plugs 104, and dropping the seat 18 into place atop the seat post 16. The tiller assembly 30 can then be adjusted for optimum steering comfort using the lever 44.

From the foregoing, it will be appreciated that the power drive scooter 10 of the present invention disassembles by hand into a small number of compact modular components. Each modular component is designed with a size and weight for easy lifting and handling as may be required, for example, to place the components into an automotive vehicle of virtually any size for transport. When a destination is reached, the components can be reassembled quickly and easily without tools, to provide the desired power drive scooter operation.

A variety of modifications and improvements to the power drive scooter of the present invention will be apparent to those skilled in the art. Accordingly, no limitation on the invention is intended by way of the foregoing description, except as set forth in the appended claims.

We claim:

1. A power drive scooter, comprising:
   a mainframe including a platform, a front wheel at a first end of the platform, and a tiller assembly connected to the front wheel for steering the scooter, the platform including at least one cup-like port located adjacent to a second end thereof;
   a trailer including a rear wheel, motor means for power driving the scooter, and a stem member adapted for overlapping engagement with the mainframe, the stem member including at least one aperture located thereon such that overlapping engagement of the stem member with the mainframe will align the at least one aperture with the at least one cup-like port;
   coupling means for detachably connecting the mainframe to the trailer, the coupling means including a first coupling attachment associated with the mainframe, and a second coupling attachment associated with the trailer, wherein the first coupling attachment is adapted for releasible engagement with the second coupling attachment;
   a power source module for the motor means; and
   a seat module including a seat post for supporting a seat over the mainframe, the seat post being removably inserted through the at least one aperture and into the at least one port to lock the trailer and the mainframe together.

2. A power drive scooter as set forth in claim 1, wherein the second coupling attachment comprises a rod fixed to the trailer, and the first coupling attachment comprises a coupling hook extending from the second end of the platform to capture the rod and thereby connect the mainframe to the trailer.

3. A power drive scooter as set forth in claim 1, wherein the motor means drive the rear wheel.

4. A power drive scooter as set forth in claim 1, wherein the at least one cup-like port comprises a plurality of such ports, and wherein the at least one aperture comprises a plurality of apertures, the plurality of cup-like ports being located at varying distances from the tiller assembly and the plurality of apertures being located such that overlapping engagement of the stem member with the mainframe will align each of the apertures with a corresponding one of the cup-like ports, wherein spacing of the seat module from the tiller assembly is adjustable by insertion of the seat post into a selected aperture and port.

5. A power drive scooter as set forth in claim 4, including a wedge disposed within the selected port, wherein the seat post has a complementary chamfered lower end shaped for mating engagement with the wedge such that the seat post lower end and the wedge cooperatively prevent rotation of the seat post within the selected aperture and port.

6. A power drive scooter as set forth in claim 1, wherein the seat is slidably receivable within the seat post and swivels relative to the seat post, and wherein the seat module includes anti-swivel means for locking the seat in a selected one of a plurality of different orientations relative to the seat post.

7. A power drive scooter as set forth in claim 6, wherein the seat post includes means for adjusting the seat to various heights relative to the platform.

8. A power drive scooter as set forth in claim 1, wherein the seat post includes a lower flange which engages the stem member to support the seat module over the stem member.

9. A power drive scooter as set forth in claim 1, wherein the power source module includes at least one storage battery for supplying electrical power to the motor means.

10. A power drive scooter as set forth in claim 9, wherein the mainframe includes at least one recess for accommodating the storage battery.

11. A power driver scooter as set forth in claim 1, wherein the trailer includes a plurality of rear wheels, and the motor means includes an electric motor, a differential connecting the motor to the rear wheels, and means for drivingly connecting the motor to the differential.

12. A power drive scooter as set forth in claim 1, wherein the tiller assembly includes means for collapsing the tiller assembly into a compact storage profile relative to the platform.

13. A power drive scooter as set forth in claim 1, wherein the trailer includes a removable cover configured as a storage tray over the motor means.

14. A power drive scooter, comprising:
    at least one battery;
    a mainframe including a platform, a front wheel supporting the platform at a first end thereof, a tiller assembly connected to the front wheel for steering the scooter, a plurality of coupling hooks extending from a second end of the platform, a first handle for lifting the mainframe, the first handle being located adjacent to the coupling hooks, a plurality of cup-like ports in the platform and located at varying distances from the tiller assembly, and means for accommodating the at least one battery thereon;

a trailer including at least two rear wheels which, along with the front wheel, support the scooter, electric motor means for driving the rear wheels, the motor means being powered by the at least one battery, a coupling rod releasably engaged by the coupling hooks for detachably connecting the trailer to the mainframe, and a stem member adapted for overlapping engagement with the mainframe when the coupling rod has been captured by the coupling hooks to connect the trailer to the mainframe, the stem member including a second handle for pivoting the trailer relative to the platform, and a plurality of apertures located such that overlapping engagement of the stem member with the mainframe will align the apertures with the cup-like ports; and a seat module including a seat post for supporting a seat upon the stem member, wherein the seat is slidably receivable within the seat post and swivels relative to the seat post, the seat module further including anti-swivel means for locking the seat in a selected orientation relative to the seat post, and means for adjusting the seat to various heights relative to the stem member, the seat post being removably inserted through one of the apertures and into the aligned port to lock the trailer and the mainframe together such that removal of the seat post is necessary to detach the trailer from the mainframe.

15. A power drive scooter as set forth in claim 14, wherein the first handle is pivotable from a non-use position to a position relatively normal to the platform for use in lifting the mainframe.

16. A power drive scooter as set forth in claim 14, wherein the mainframe includes means for collapsing the tiller assembly into a compact storage profile, wherein the means for collapsing also allow the tiller assembly to be adjusted to a variety of orientations relative to the platform.

17. A power drive scooter as set forth in claim 14, wherein the motor means includes a differential connecting an electric motor to the rear wheels, and means for drivingly connecting the motor to the differential.

18. A power drive scooter as set forth in claim 14, wherein the cup-like ports and the first handle are included on a reinforced base located adjacent to the second end of the platform, wherein the stem member and the reinforced base have corresponding shapes that mate upon overlapping engagement of the stem member with the mainframe.

19. A power drive scooter as set forth in claim 18, wherein the seat post includes a lower flange spaced from a lower end of the seat post such that the seat post is supported by the lower flange as it engages an upper surface of the stem member, to permit the lower end of the seat post to extend into a cup-like port without requiring the mainframe to directly support the seat module.

20. A power drive scooter as set forth in claim 14, including at least one battery container for accommodating the at least one battery therein, the battery container being sized to fit within the accommodating means of the platform.

21. A power drive scooter as set forth in claim 14, including a storage basket attached to the tiller assembly.

22. A method of disassembling a modular scooter including a mainframe having a coupling hook extending therefrom, a trailer detachably connected to the mainframe and having a coupling rod in releasible engagement with the coupling hook to connect the trailer to the mainframe, and a stem member in overlapping engagement with the mainframe, the stem member including an aperture therethrough, and a seat supported upon a seat post removably inserted through the aperture which prevents disengagement of the coupling hook and rod, the steps comprising:
removing the seat post from the aperture;
pivoting the trailer relative to the mainframe; and
lifting the mainframe by the first handle to disengage the coupling hook from the coupling rod.

23. A method as set forth in claim 22, including the step of pivoting the trailer to a position relatively normal to the mainframe.

24. A method as set forth in claim 22, including the step of removing the seat from the seat post.

25. A power drive scooter, comprising:
a mainframe including a platform, a front wheel at a first end of the platform, and a tiller assembly connected to the front wheel for steering the scooter the platform including at least one port located adjacent to a second end thereof;
a trailer including a rear wheel, motor means for power driving the scooter, and a stem member adapted for overlapping engagement with the mainframe, the stem member including at least one aperture located thereon such that overlapping engagement of the stem member with the mainframe will align the at least one aperture with the at least one port; and
means for detachably connecting the mainframe to the trailer, the connecting means including a seat post for supporting a seat over the mainframe, the seat post being removably inserted through the at least one aperture and into the at least one port to lock the trailer and the mainframe together.

26. A power drive scooter as set forth in claim 25, wherein the at least one port comprises a plurality of such ports, and wherein the at least one aperture comprises a plurality of apertures, the plurality of ports being located at varying distances form the tiller assembly and the plurality of apertures being located such that overlapping engagement of the stem member with the mainframe will align each of the apertures with a corresponding one of the ports, wherein spacing of the seat from the tiller assembly is adjustable by insertion of the seat post into a selected aperture and port.

27. A power drive scooter as set forth in claim 26, including a wedge disposed within the selected port, wherein the seat post has a complementary chamfered lower end shaped for mating engagement with the wedge such that the seat post lower end and the wedge cooperatively prevent rotation of the seat post within the selected aperture and port.

28. A power drive scooter as set forth in claim 25, wherein the connecting means includes a rod fixed to the trailer, and a coupling hook extending from the second end of the platform to capture the rod and thereby connect the mainframe to the trailer.

29. A power drive scooter, comprising:
a mainframe including a platform, a front wheel at a first end of the platform, and a tiller assembly connected to the front wheel for steering the scooter;
a trailer including a rear wheel and motor means for power driving the scooter; and
means for detachably connecting the mainframe to the trailer, the connecting means including a first coupling attachment associated with the mainframe, and a second coupling attachment associated with the trailer, wherein the first coupling attachment is capable of engaging and disengaging the second coupling attachment when the trailer is pivoted upwardly into a first position relative to the mainframe, and the first coupling attachment is incapable of engaging and disengaging the second coupling attachment when the trailer is pivoted into a second position relative to the mainframe, wherein the power drive scooter is normally used with the trailer in the second position.

30. A power drive scooter as set forth in claim 29, wherein the second coupling attachment includes a rod fixed to the trailer, and wherein the first coupling attachment includes a coupling hook extending from a second end of the platform to capture the rod and thereby connect the mainframe to the trailer.

31. A power drive scooter as set forth in claim 29, wherein the platform includes at least one port located adjacent to a second end thereof, the trailer includes a stem member adapted for overlapping engagement with the mainframe, the stem member including at least one aperture located thereon such that overlapping engagement of the stem member with the mainframe will align the at least one aperture with the at least one port, and wherein the connecting means includes a seat post for supporting a seat over the mainframe, the seat post being removably inserted through the at least one aperture and into the at least one port to lock the trailer and the mainframe together.

32. A power drive scooter as set forth in claim 31, wherein the at least one port comprises a plurality of such ports, and wherein the at least one aperture comprises a plurality of apertures, the plurality of ports being located at varying distances from the tiller assembly and the plurality of apertures being located such that overlapping engagement of the stem member with the mainframe will align each of the apertures with a corresponding one of the ports, wherein spacing of the seat from the tiller assembly is adjustable by insertion of the seat post into a selected aperture and port.

* * * * *

UNITED STATES PATENT AND TRADEMARK OFFICE
CERTIFICATE OF CORRECTION

PATENT NO. : 5,020,624

DATED : June 4, 1991

INVENTOR(S) : Elaine M. Nesterick, Robert W. Reynolds, Spencer L. MacKay and Cleve A. Graham It is certified that error appears in the above-identified patent and that said Letters Patent is hereby corrected as shown below:

In column 3, line 19, delete the word "em" and insert therefor --embodying--.

In column 7, line 53, delete "10" and insert therefor --18--.

In column 12, line 50, delete the word "form" and insert therefor --from--.

Signed and Sealed this

Fifteenth Day of December, 1992

Attest:

DOUGLAS B. COMER

Attesting Officer

Acting Commissioner of Patents and Trademarks